(12) United States Patent
Feng et al.

(10) Patent No.: US 12,346,749 B2
(45) Date of Patent: Jul. 1, 2025

(54) ADAPTIVE APPLICATION SERVER REQUEST BALANCING

(71) Applicant: SAP SE, Walldorf (DE)

(72) Inventors: Dabin Feng, Shanghai (CN); Xia Yu, Shanghai (CN); Chen Feng, Shanghai (CN)

(73) Assignee: SAP SE, Walldorf (DE)

( * ) Notice: Subject to any disclaimer, the term of this patent is extended or adjusted under 35 U.S.C. 154(b) by 664 days.

(21) Appl. No.: 17/836,042

(22) Filed: Jun. 9, 2022

(65) Prior Publication Data

US 2023/0401106 A1 Dec. 14, 2023

(51) Int. Cl.
*G06F 9/50* (2006.01)

(52) U.S. Cl.
CPC .................. *G06F 9/5083* (2013.01)

(58) Field of Classification Search
CPC ........... G06F 9/5083; G06F 2209/5022; G06F 2209/548; G06F 9/5027; G06F 9/505
See application file for complete search history.

(56) References Cited

U.S. PATENT DOCUMENTS

| | | | |
|---|---|---|---|
| 7,523,106 B2 | 4/2009 | Russell et al. | |
| 10,489,381 B2 | 11/2019 | Yu et al. | |
| 10,503,572 B2 | 12/2019 | Peng et al. | |
| 10,565,089 B2 | 2/2020 | Yu et al. | |
| 11,153,374 B1 | 10/2021 | Yu et al. | |
| 11,334,558 B2 | 5/2022 | Yu et al. | |
| 2008/0209044 A1* | 8/2008 | Forrester | G06F 9/505 709/226 |
| 2016/0292011 A1* | 10/2016 | Colson | G06F 9/5027 |
| 2018/0173805 A1 | 6/2018 | Landes et al. | |
| 2020/0057761 A1 | 2/2020 | Yu et al. | |
| 2020/0233773 A1* | 7/2020 | Hsu | G06F 11/3055 |
| 2021/0173838 A1 | 6/2021 | Yu et al. | |
| 2022/0027210 A1* | 1/2022 | Barik | G06F 13/4239 |
| 2022/0129314 A1 | 4/2022 | Yu et al. | |
| 2022/0171663 A1* | 6/2022 | Hiregoudar | G06F 3/0631 |

* cited by examiner

*Primary Examiner* — Brian W Wathen
(74) *Attorney, Agent, or Firm* — Fish & Richardson P.C.

(57) ABSTRACT

Methods, systems, and computer-readable storage media for adaptive application server request balancing. An example method includes receiving, from a load balancer, an application request for a first application at a first application server. In response to determining that a complexity value for the application request is greater than a complexity value threshold and that an occupancy value for the first application server is greater than an occupancy value threshold, the application request is provided to a global task queue that is accessible by the first application server and other application servers. A notification is received from a second application server of a completion of the application request by the second application server. A completion result of the completion of the application request by the second application server is retrieved from a global results queue and the completion result is provided to the first application in response to the application request.

20 Claims, 11 Drawing Sheets

ADAPTIVE APPLICATION SERVER REQUEST BALANCING

BACKGROUND

Enterprises can use enterprise applications to support and execute operations. Enterprise applications can be deployed in cloud computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). In some instances, clients (e.g., client-side computing devices) transmit requests to a cloud computing environment, which requests are routed to a server for processing.

SUMMARY

Implementations of the present disclosure are directed to request handling in cloud computing environments. More particularly, implementations of the present disclosure are directed to proactive and adaptive request dispatching that enables selective re-dispatching of requests between servers in a cloud computing environment. In some implementations, actions include: receiving an application request for a first application at a first application server and from a load balancer; and in response to determining that a complexity value for the application request is greater than a complexity value threshold and that an occupancy value for the first application server is greater than an occupancy value threshold, providing the application request to a global task queue that is accessible by the first application server and other application servers; receiving a notification from a second application server of a completion of the application request by the second application server; retrieving, from a global results queue, a completion result of the completion of the application request by the second application server; and providing the completion result to the first application in response to the application request. Other implementations of this aspect include corresponding systems, apparatus, and computer programs, configured to perform the actions of the methods, encoded on computer storage devices.

These and other implementations can each optionally include one or more of the following features. The complexity value for the application request can be determined based on a query string complexity, a historical response time for similar requests, and historical record counts for similar requests. Different weights can be used, when determining the complexity value, for the query string complexity, the historical response time for similar requests, and the historical record counts for similar requests. The occupancy value for the first application server can be determined based on a processor utilization value, a memory utilization value, and a number of active worker threads. Different weights can be used, when determining the occupancy value, for the processor utilization value, the memory utilization value, and the number of active worker threads. The second application server can determine that an occupancy value for the second application server is less than the occupancy value threshold and that the application request is included in the global task queue, retrieve the application request from the global task queue, process the application request and determine the completion result for the application request, and place the completion result into the global results queue. The first application server can monitor the global results queue for completion of the application request by an application server other than the first application server.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to request handling in cloud computing environments. More particularly, implementations of the present disclosure are directed to proactive and adaptive request dispatching that enables selective re-dispatching of requests between servers in a cloud computing environment.

To provide further context for implementations of the present disclosure, and as introduced above, enterprises can use enterprise applications to support and execute operations. Enterprise applications can be deployed in cloud computing environments, which includes execution of the enterprise applications within a data center of a cloud-computing provider as part of an infrastructure-as-a-service (IaaS) offering. Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services).

A load balancer can be used to dispatch requests to application servers. Load balancers may dispatch application requests without understanding request logic or required processing effort. A load balancer can use a policy to dispatch requests to different servers. As mentioned, a load balancer policy such as a round-robin policy may unintelligently assign application requests to application servers without considering a size or processing effort of the request or a current workload of an application server whose turn it is to receive a request. With a round-robin policy, a request may be sent to an application server that has little available capacity rather than another application server that has sufficient capacity to handle the request. Moreover, a load balancer may assign a request that has a substantial processing effort (e.g., described herein as a "heavy" request) to a server that is busy processing other requests. Assigning a heavy request to a busy application server can result in a slowdown of the processing of current requests, a delay in processing the just-assigned request, or even a server overload or crash situation.

Some load balancers may employ other types of policies than round-robin scheduling, such as policies where each backend server reports server status to the load balancer. The load balancer can then dispatch application requests to servers based on server status values received from the servers. However, continual sending and receiving of status values between the servers and the load balancer imparts a resource cost. Additionally, a communication time and a processing time for the server statuses introduces a lag which can result in server status values being out of date by the time a load balancer makes a dispatching decision.

To solve problems of server status lag time and/or unintelligent load balancing dispatching, implementations of the present disclosure provide an adaptive application server request balancing approach. The adaptive application server requesting balancing approach can include use of a global task queue into which busy application servers place tasks and idle application servers fetch tasks. Accordingly, busy application servers can leverage other idle application servers to handle tasks initially assigned to the busy application servers.

An application server itself can determine to place a task in the global task queue based on a current status of the application server (and in some cases, based on a size or processing effort of the request). Since the application server doesn't send a server status to the load balancer, a lag time for use of the server status can be avoided. Current load balancers can be used without modification and the application server itself can determine whether to process a request or place a request in the global task queue. If a load balancer initially sends a large request to a busy application server, the application server can determine to place the request in the global task queue. Resources of an idle server can be used when the idle server retrieves a request from the global task queue and processes the request. The adaptive application server request balancing solution can improve the average efficiency of each application server and increase an overall throughput of the system. Additionally, server issues or crashes from overloaded server systems can be avoid.

Figure 1:
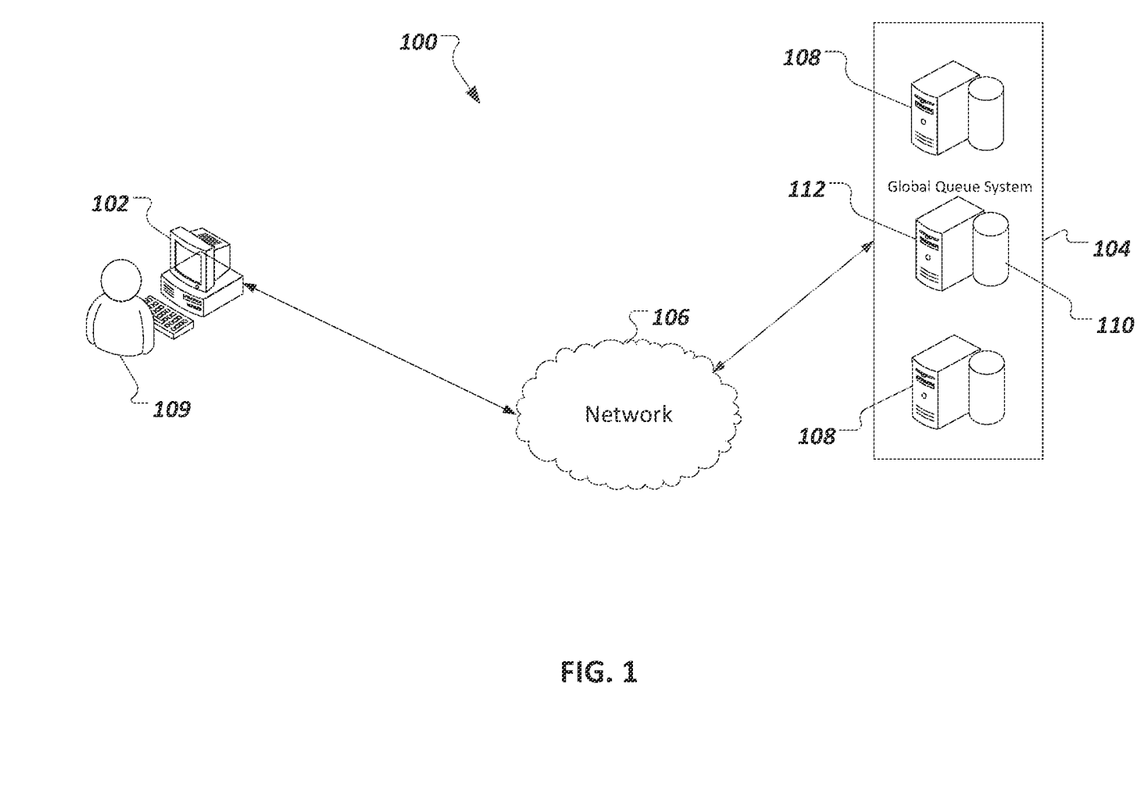
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 109 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

As described in more detail below, the server system 104 can include a shared global queue 110 (e.g., in or associated with a global queue system 112). Servers 108 that are busy can push large/complex requests to the shared global queue 110 and servers 108 that have idle capacity can proactively retrieve requests from the shared global queue 110 and process the requests on behalf of the busy servers 108. Accordingly, resources of the server system 104 can be used efficiently and an overall throughput of the server system 104 can be increased, as compared to other approaches such as round-robin scheduling.

Figure 2:
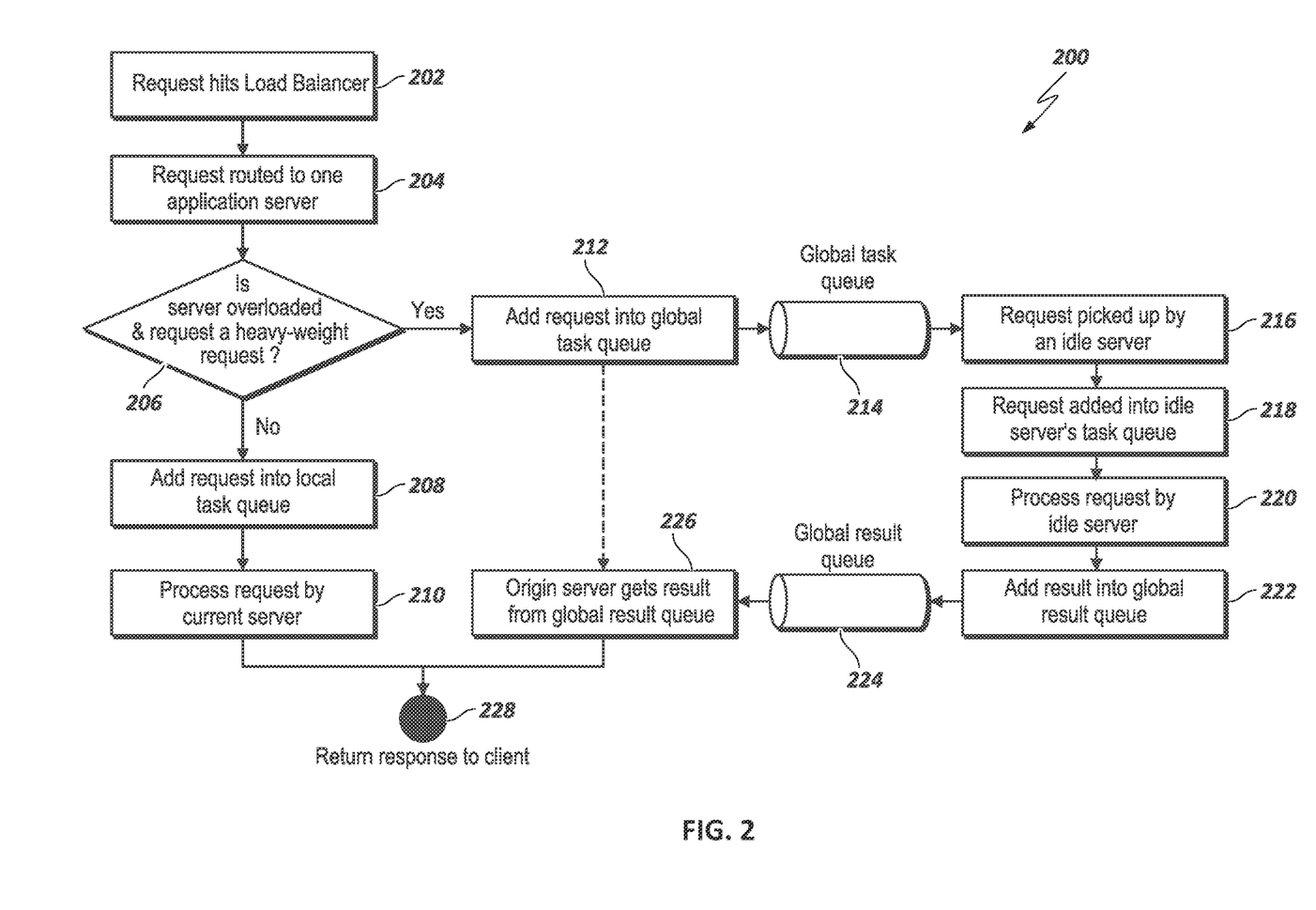
FIG. 2 depicts an example process that can be executed in accordance with implementations of the present disclosure.

FIG. 2 depicts an example process 200 that can be executed in accordance with implementations of the present disclosure. In some examples, the example process 200 is provided using one or more computer-executable programs executed by one or more computing devices.

At 202, a request is received by a load balancer (e.g., from a requesting client).

At 204, the load balancer routes the request to a first application server (e.g., a server "A"), based on a routing policy. The routing policy can be a round-robin policy, for example, where requests are routed to servers, in a defined order.

At 206, the first application server determines if the first application server is overloaded and the request is a heavy-weight request. The first application server can be considered to be overloaded if a current available capacity of the first application server is less than a threshold, for example. The first application server can determine that the request is a heavy-weight request, for example, based on an evaluation of the request. The first application server can determine an estimated processing effort of the request, for example. For some requests, an estimated effort can be based on an estimated number of database records that may need to be retrieved and/or processed, for example.

In further detail, the first application server can determine whether the first application server is overloaded by calculating an occupancy value $O_a$ using the below formula:

$$O_a = \Sigma C_a * W_c + M_a * W_m + Th_a * W_{th}$$

where $C_a$ is a CPU (Central Processing Unit) utilization value for the server, $M_a$ is a memory utilization value for the server, $Th_a$ is a count of active worker threads for the server, and $W_c$, $W_m$, and $W_{th}$ are respective weights for the CPU utilization value, the memory utilization value, and count of active worker threads, where $W_c + W_m \pm W_{th} = 1$. If the occupancy value $O_a$ is greater than a predetermined occupancy threshold, the first application server can determine the first application server is overloaded (e.g., busy).

The first application server can determine if the request is a heavy-weight request by calculating a complexity value C r for the request using the below formula:

$$C_r = \Sigma Q_r * W_q + T_r * W_t + N_r * W_n$$

where $Q_r$ is a query string complexity value for the request, $T_r$ is a historical response time for similar requests, $N_r$ is a historical record count metric for similar requests, and $W_q$, $W_t$ and $W_n$ are respective weights of the query string complexity, the historical response time, and the historical record count, where $W_q + W_t + W_n = 1$. If the complexity value $C_r$ is greater than a predetermined complexity value threshold, the first application server can determine the request is a heavy-weight request. The complexity value can represent a processing effort for the request, for example.

In further detail, the query complexity $Q_r$ can be calculated using different approaches. For instance, the query complexity can be calculated based on complexity of back-end query statements and/or on complexity of entities that are involved in the queries. For example, query complexity can be based on one or more of 1) a count of fields in the query; 2) a count of filters in the query; 3) depth of filter(s) in the query; 4) a count of sorting fields in the query; 5) depth of sorting operation(s); and 6) a count of tables that are involved in the query. The query complexity value for a query can be an aggregation of these factors. The historical record count $N_r$ can be determined from response header information, for example. The historical response time values $T_r$ can also be determined from response data.

The weight values $w_q$, $W_t$ and $W_n$ can be configured using different approaches. For instance, for systems in which customer application response time is a most significant goal, the weight value $W_t$ may be configured to be larger than the $W_q$ and $W_n$ values. As another example, for a system that is used primarily for data integration with other system(s), such as for nightly data synchronizations, response time may not be as significant a factor, and a value for $W_q$ may be configured to be larger than the $W_t$ and $W_n$ values.

At 208, if the first application server is not overloaded and/or if the request is not a heavy-weight request, the first application server adds the request to a local task queue of the first application server.

At 210, the first application server retrieves the request from the local task queue of the first application server and processes the request. After processing the request, the first application server can recalculate an occupancy value (or can recalculate an occupancy value on demand in response to a subsequent request).

At 212, if the first application server has determined that the first application server is overloaded and that the request is a heavy-weight request, the first application server adds the request to a global task queue 214. The global task queue 214 can be a queue that is accessible by multiple application servers. If a given application server is idle (or otherwise has sufficient available capacity), the idle server can retrieve tasks or requests from the global task queue 214.

At 216, for example, a second application server (e.g., an idle server) retrieves the request from the global task queue 214. The second application server can be considered an idle server based on a current available capacity of the second application server being more than a threshold, for example. As another example, the second application server can determine that an occupancy value is less than a predetermined occupancy threshold, using the occupancy value formula described above. In some cases, the second application server can determine to retrieve the request from the global task queue 214 based on both an occupancy value and a complexity value of the request. For example, the second application server can determine, based at least in part on the complexity value of the request, that processing the request would not result in a new occupancy value becoming greater than the occupancy value threshold. After processing the request, the second application server can recalculate an occupancy value for the second server.

At 218, the second application server adds the request to a local task queue of the second application server.

At 220, the second application server retrieves the request from the local task queue of the second application server and processes the request.

At 222, the second application server adds result information for the processing of the request to a global result queue 224.

At 226, the first application server (which can be considered an origin server, or a server that first received the request) retrieves the result information from the global result queue.

At 228, the first application server returns result information to the requesting client. The first application server can return result information from the first application server itself processing the request (e.g., at 210) or result information from the second application server processing the request on behalf of the first application server (e.g., at 220). Regarding tracking of request and results through the global queue cluster, when a server sends a request to the global queue cluster, the request can be associated with information identifying the server that had sent the request (e.g. a request can be in a general format of: "request:[Req_ID, Server_ID]"). A result can be associated with information identifying the request and the server that had sent the request (e.g., a result can be in a general format of: "result:[Req_ID, Server_ID]").

Figure 3A:
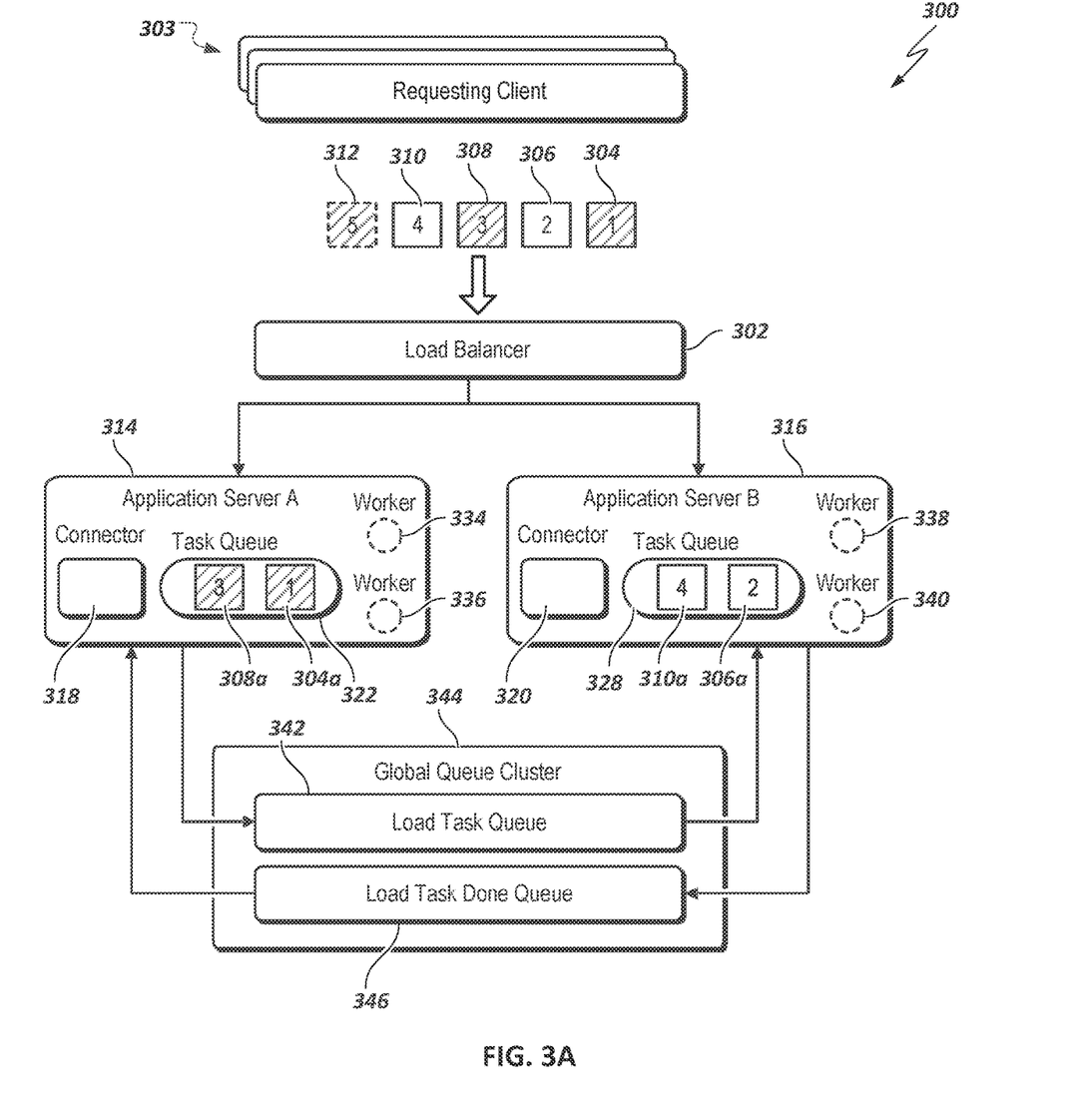
FIG. 3A-3G depict an example conceptual architecture in accordance with implementations of the present disclosure.

FIGS. 3A-3G depict an example conceptual architecture 300 in accordance with implementations of the present disclosure. Referring to FIG. 3A, a load balancer 302 receives different requests at different times from one or more requesting clients 303. Some requests can be considered "heavy" requests and other requests may be considered "light" requests. For example, the load balancer 302 can receive a first request 304, a second request 306, a third request 308, a fourth request 310, and a fifth request 312, with the first request 304, the third request 308, and the fifth request 312 being heavy requests (e.g., as indicated with a hashed style) and the second request 306 and the fourth request 310 being light requests (e.g., as indicated with a non-hash style).

The load balancer 302 can dispatch requests according to a policy, such as round-robin policy. For example, the load balancer can alternate dispatching requests to an application server A 314 or an application server B 316. For instance, based on the policy, the first request 304 and the third request 308 have been assigned to the application server A 314 and the second request 306 and the fourth request 310 have been assigned to the application server B 316. The fifth request 312 may have been recently received and is yet to be assigned. The assigning of the fifth request 312 will be described in FIG. 3B.

Respective connectors allow application servers to receive requests from the load balancer 302. For example, the application server A 314 includes a connector 318 and the application server B 316 includes a connector 320. Requests received from the load balancer 302 can be stored in a local task queue of a respective application server. For example, the application server B 314 has stored the first request 304 and the third request 308 in a local task queue 322 of the application server A 314 (e.g., as illustrated by stored requests 304a and 308a, respectively). As another example, the application server B 316 has stored the second request 306 and the fourth request 310 in a local task queue 328 of the application server B 316 (e.g., as illustrated by stored requests 306a and 310a, respectively).

As described in more detail below, an application server can assign requests in a local task queue to worker threads of the application server. For example, the application server A 314 includes worker threads 334 and 336 and the application server B 316 includes worker threads 338 and 340. Also as described in more detail below, a busy application server can place a received heavy request into a load task queue 342 of a global queue cluster 344. An idle server with capacity can retrieve a request from the load task queue 342, assign the task to a worker thread of the idle server, and put a processing result of processing the request into a load task done queue 346 of the global queue cluster 344. The busy server can retrieve the result from the load task done queue 346 and provide the result to a requesting client. In some implementations, to avoid a situation that the queues in the global queue cluster 344 are a bottle neck, global queue replication can be employed by using multiple global queue clusters.

Figure 3B:
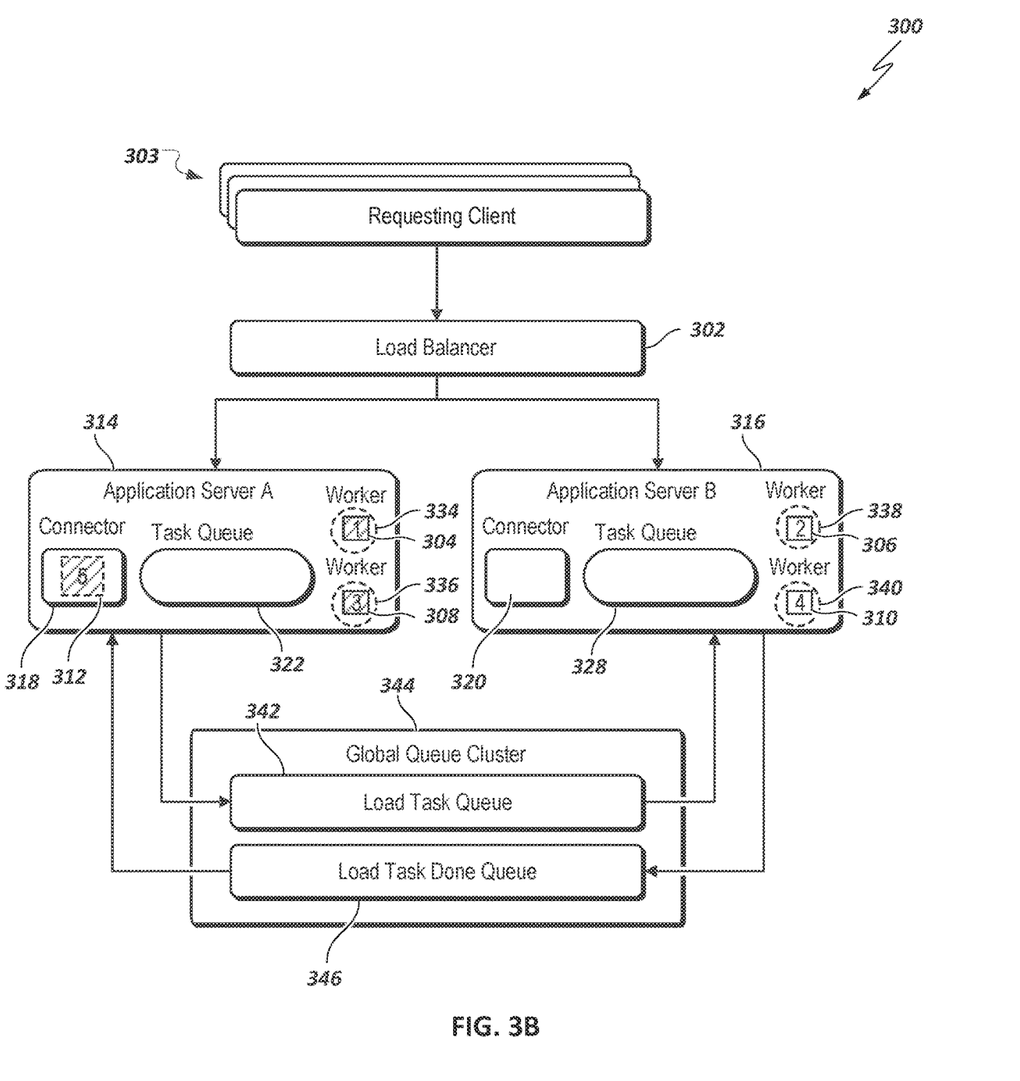

Referring now to FIG. 3B, the application server A 314 has assigned the first request 304 to the first worker thread 334 and the third request 308 to the second worker thread 336 (and removed those requests from the local task queue 322). Similarly, the application server B 316) has assigned the second request 306 to the first worker thread 338 and the fourth request 310 to the second worker thread 340 (and removed those requests from the local task queue 328).

The load balancer 302 has assigned the fifth request 512 to the application server A 314. For example, the fifth request 312 is received from the load balancer 302 at the connector 318 of the application server A 314. The application server A 314 can determine that the fifth request 312 is a heavy request and that the application server A 314 currently has available capacity below a threshold (e.g., due to currently processing the first request 304 and the third request 308 which are also heavy requests). Based on determining that the fifth request is a heavy request and that the available capacity of the application server A 314 is less than a threshold, the application server A 314 can determine to place the fifth request 312 into the load task queue 342, rather than process the fifth request 312, to provide an opportunity for another application server to process the fifth request 312.

Figure 3C:
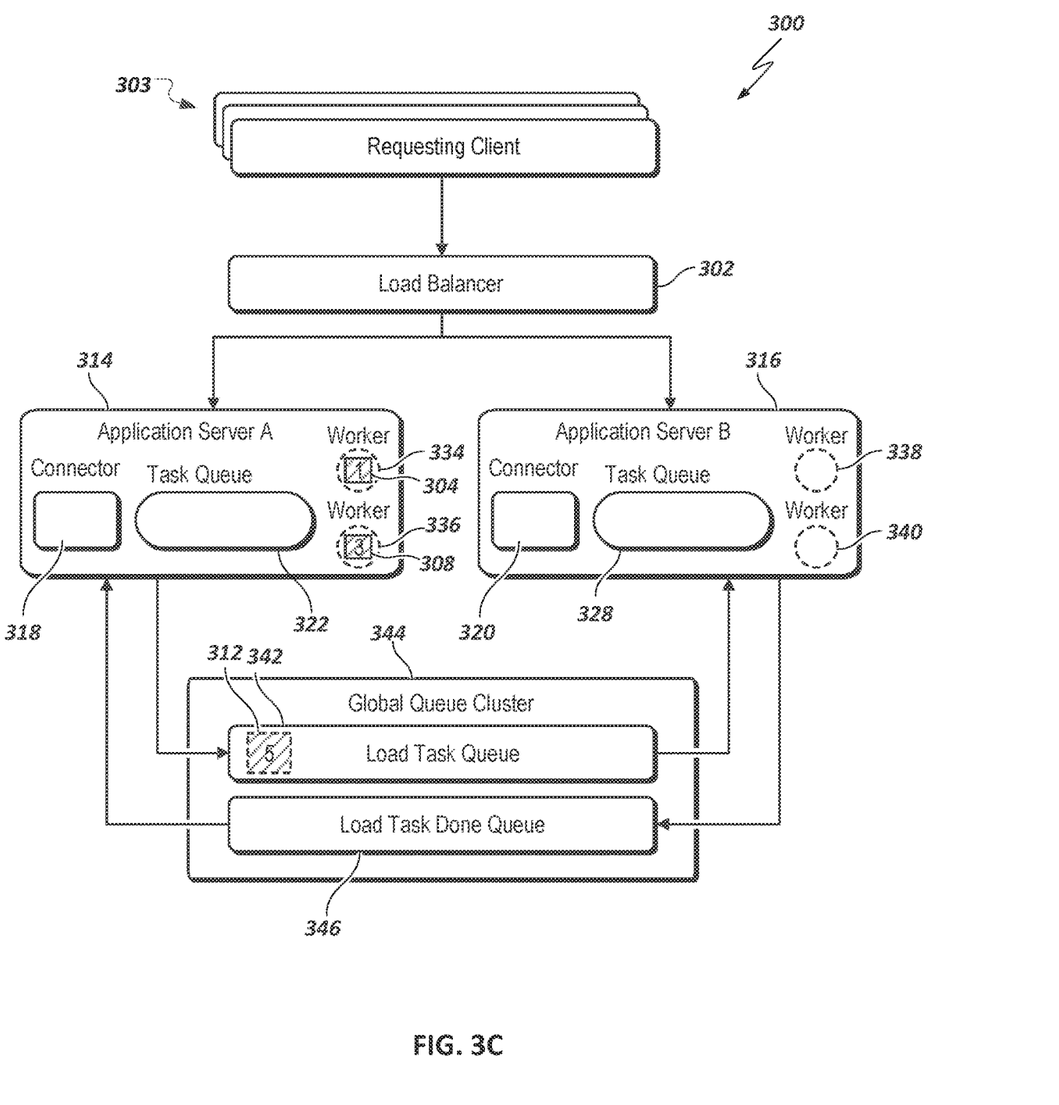

Referring now to FIG. 3C, the load task queue 342 now includes the fifth request 312. For example, the fifth request 312 has been placed into the load task queue 342 by the application server A 314. As described above, the application server A 314 may have placed the fifth request 312 into the load task queue 342 based on a size complexity of the fifth request 312 and based on the application server A 314 being busy (e.g., available worker threads 334 and 336 are still processing the first request 304 and the third request 308, respectively). After placing the fifth request 312 into the load task queue 342, the application server A 314 can monitor the load task done queue 346 for processing results of the fifth request 312 from processing performed by another server. As described in more detail below, an idle server can determine that the idle server has capacity to process the fifth request 312. For example, the application server B 316 currently has available capacity (e.g., worker threads 338 and 340 are not currently processing any requests).

Figure 3D:
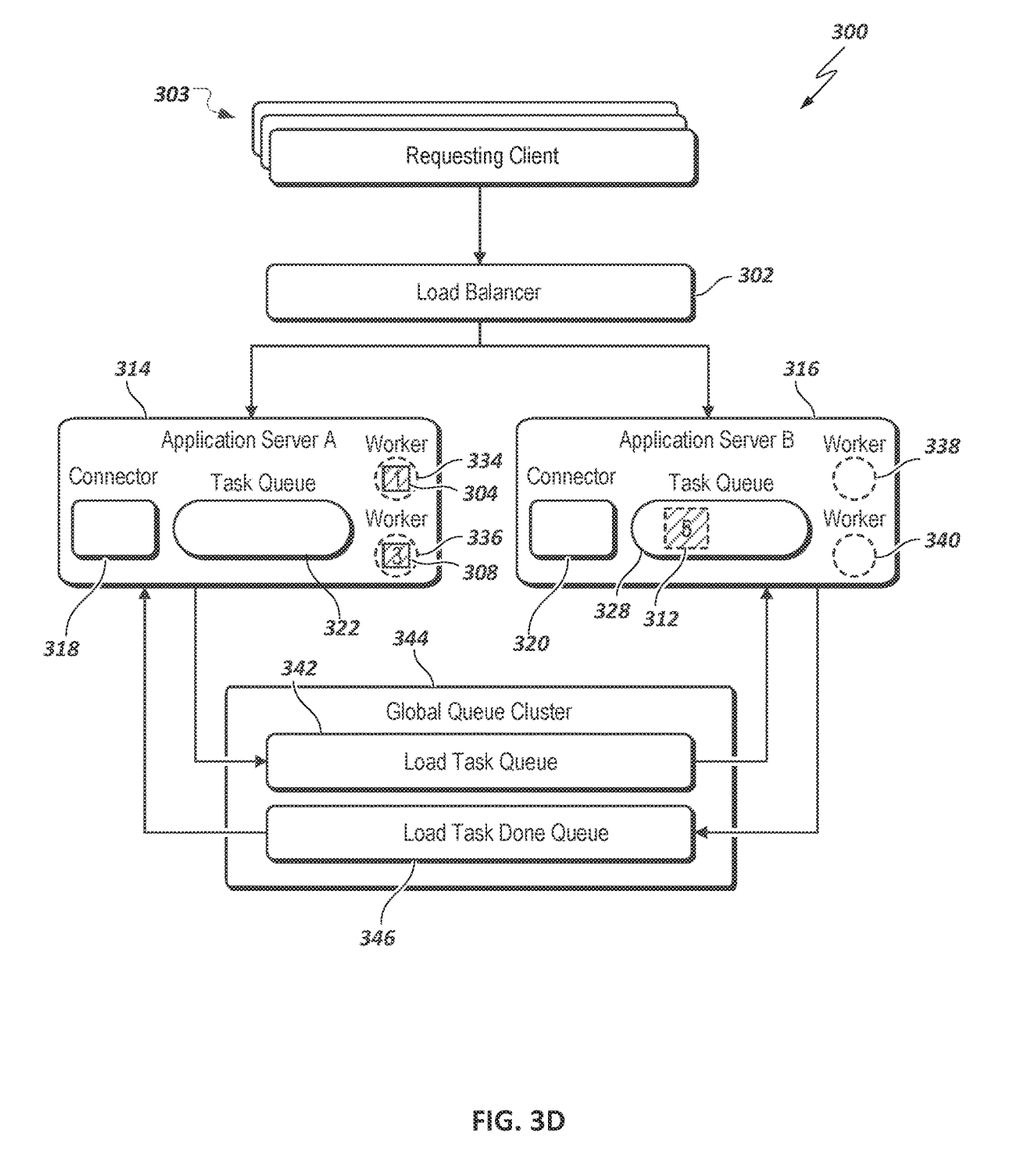

Referring now to FIG. 3D, the application server B 316 has retrieved the fifth request 312 from the load task queue 342 and placed the fifth request 312 in the local task queue 328 of the application server B 316. As described below, the application server B 316 can assign the fifth request 312 to a local worker thread (e.g., the first worker thread 338 or the second worker thread 340). The application server A 314 continues to process requests (e.g., in the first worker thread 334 and the second worker thread 336).

Figure 3E:
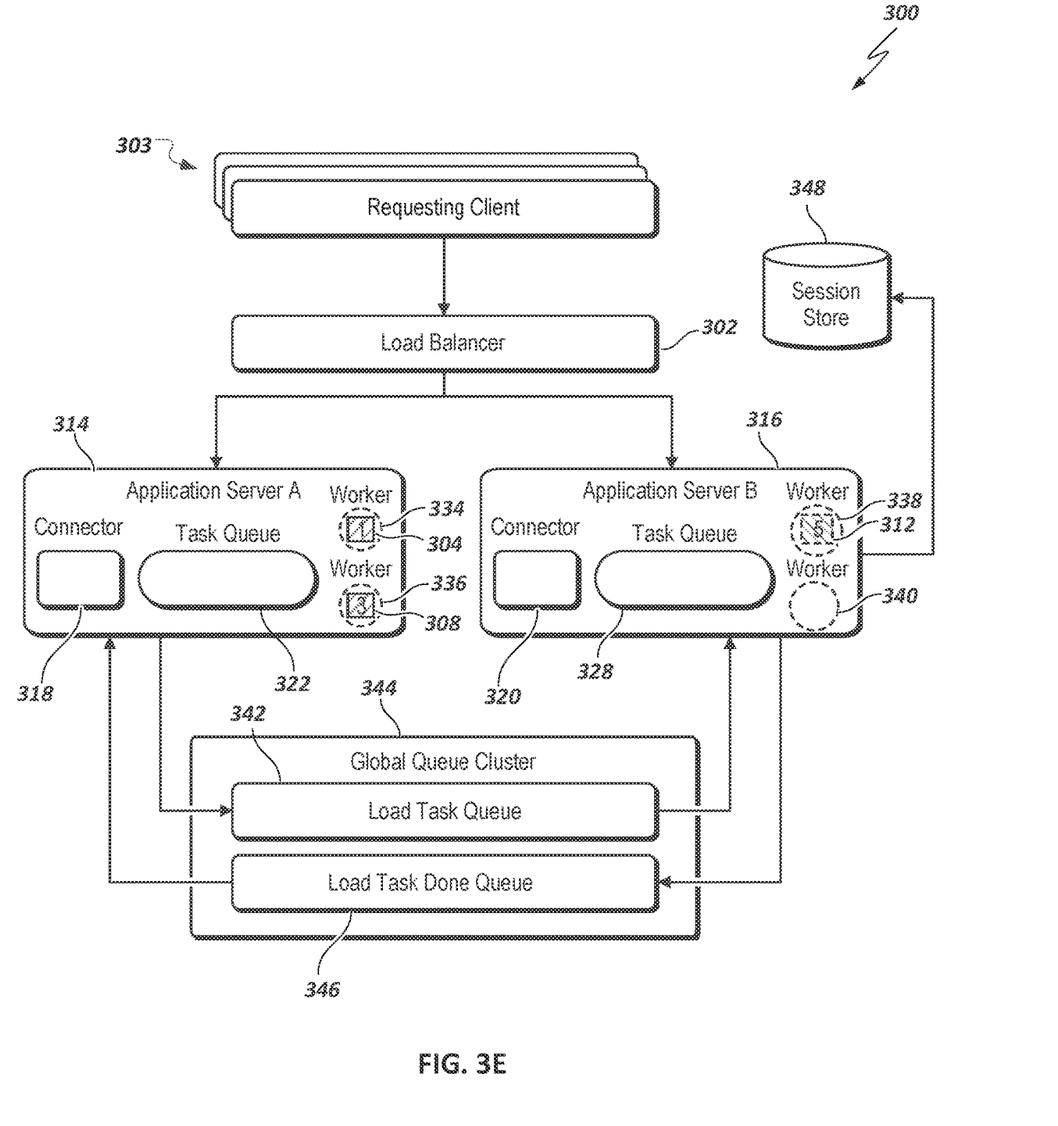

Referring now to FIG. 3E, the application server B 316 has assigned the fifth request 312 to the first worker thread 338 (and has removed the fifth request 312 from the local task queue 328). The first worker thread 338 can use a session store 348 when processing the fifth request 312. The session store 348 can be used by worker threads for use and reuse of resources when working on requests. The session store 348 can remain available between processing of different tasks by a given idle server (e.g., so that the idle server does not need to create a new session each time the idle server works on an available task). As described below, when the first worker thread 338 has finished processing the fifth request 312, the application server B 316 can store results of the processing in the global task done queue 346.

Figure 3F:
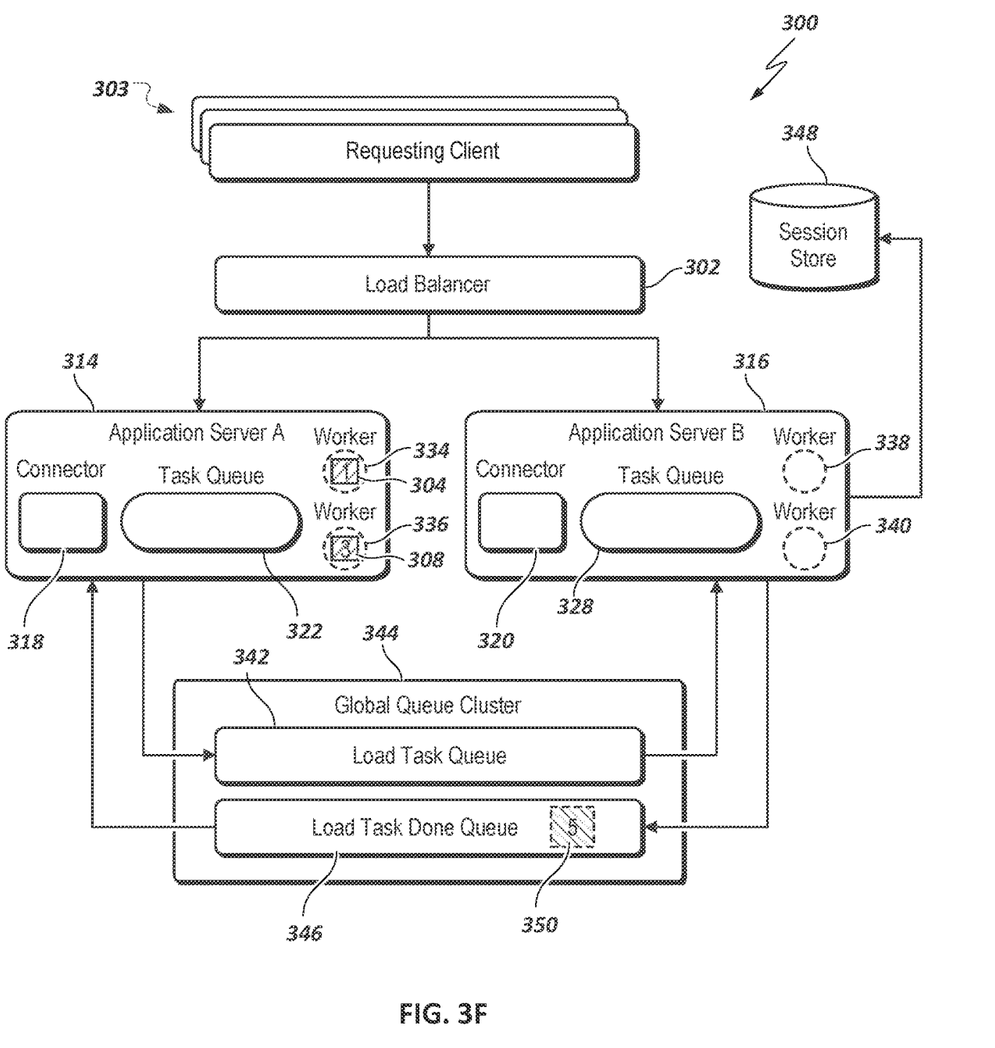

Referring now to FIG. 3F, the application server B 316 has stored results 350 of the processing of the fifth request 312 in the global task done queue 346. As described below, the application server A 314 that had initially been assigned the fifth request 312 can retrieve the results 350 from the global task done queue 346.

Figure 3G:
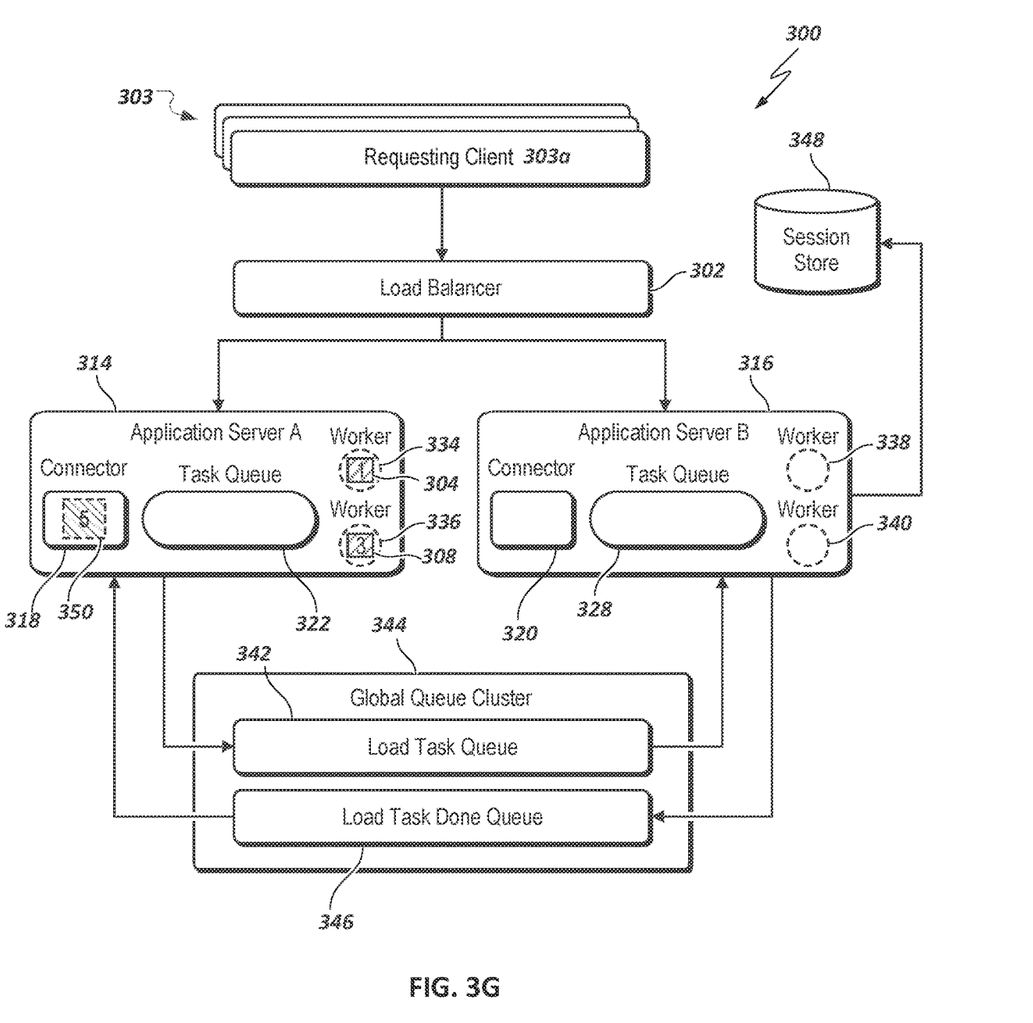

Referring now to FIG. 3G, the application server A 314 has retrieved the results 350 for the fifth request 312 from the local task done queue 346. The results 350 are currently included in the connector 318. The results 350 can describe processing results of a processing of the fifth request 312 by the application server B 316. The application server A 314 can send the results 350, using the connector 318, to a requesting client (e.g., a requesting client 303a) that initially sent the fifth request 312 to the load balancer 302.

Figure 4:
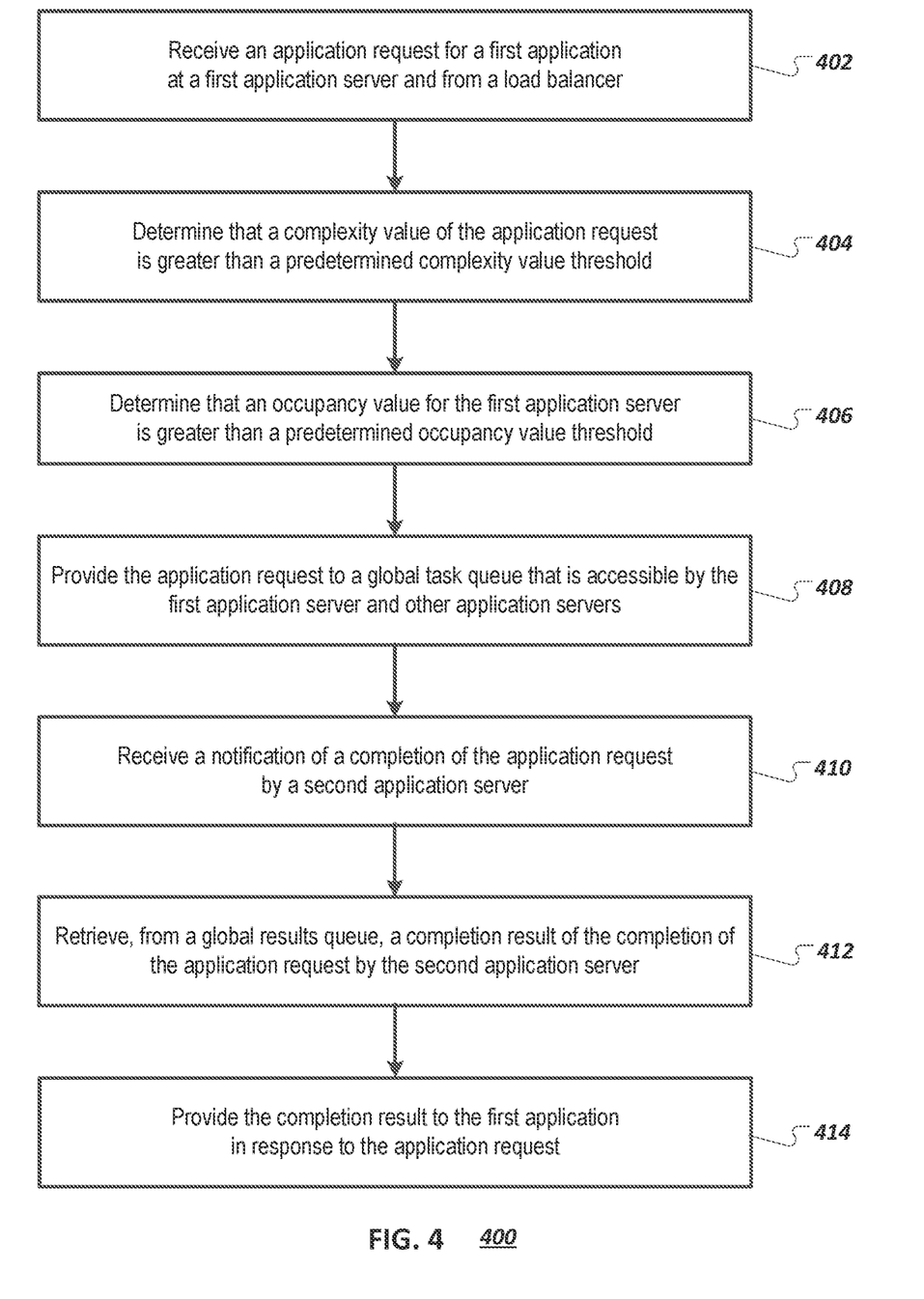
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

An application request for a first application is received at a first application server and from a load balancer (402).

A determination is made that a complexity value for the application request is greater than a predetermined complexity value threshold (404). The complexity value for the application request can be determined based on a query string complexity, a historical response time for similar requests, and historical record counts for similar requests. In some implementations, different weights are used, when determining the complexity value, for the query string complexity, the historical response time for similar requests, and the historical record counts for similar requests.

A determination is made that an occupancy value for the first application server is greater than a predetermined occupancy value threshold (406). The occupancy value for the first application server can be determined based on a processor utilization value, a memory utilization value, and a number of active worker threads. In some implementations, different weights are used, when determining the occupancy value, for the processor utilization value, the memory utilization value, and the number of active worker threads.

Based on the complexity value for the application request being greater than the predetermined complexity value threshold and the occupancy value for the first application server being greater than the predetermined occupancy value threshold, the application request is provided to a global task queue that is accessible by the first application server and other application servers (408).

A notification is received from a second application server of a completion of the application request by the second application server (410). For example, the first application server can subscribe to notifications regarding the application request (e.g., after the application request is provided to the global task queue). Before processing the application request, the second application server can determine that an occupancy value for the second application server is less than the predetermined occupancy value threshold. The second application server can determine that the application request is included in the global task queue, retrieve the application request from the global task queue, process the application request and determine the completion result for the application request, and place the completion result into the global results queue. After placing the application request into the global task queue, the first application server can monitor the global results queue for completion of the application request by an application server other than the first application server. In some cases, the first application server can receive a notification regarding insertion by the second application server of a completion result for the application request into a global results queue.

A completion result of the completion of the application request by the second application server is retrieved from the global results queue (412).

The completion result is provided to the first application in response to the application request (414).

Figure 5:
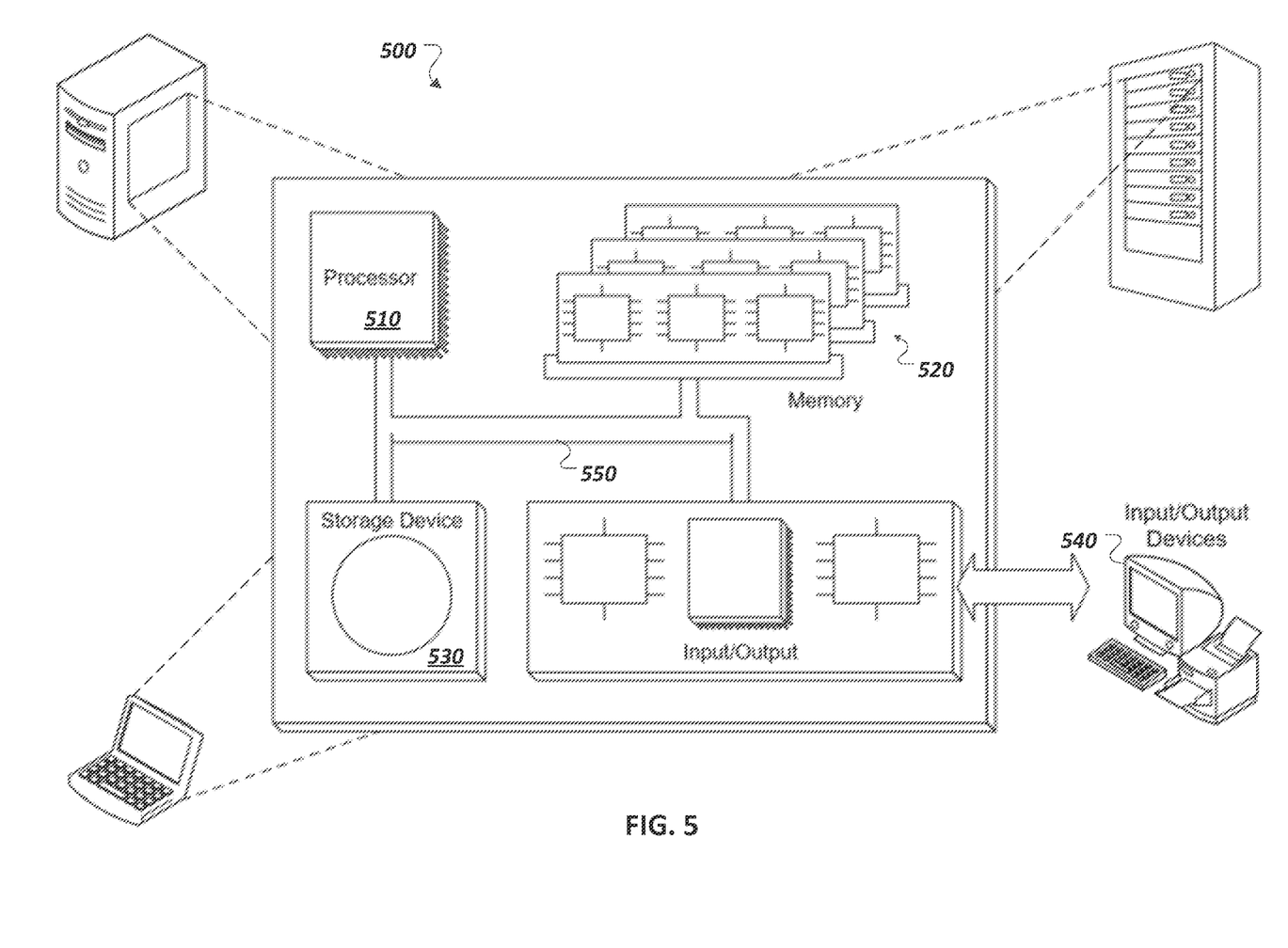
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor.

The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and MID-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for adaptive application server request balancing, comprising:
   receiving an application request for a first application at a first application server and from a load balancer;
   in response to determining that a complexity value for the application request is greater than a complexity value threshold and that an occupancy value for the first application server is greater than an occupancy value threshold, providing the application request to a global task queue that is accessible by the first application server and other application servers;
   receiving a notification from a second application server of a completion of the application request by the second application server;
   retrieving, from a global results queue, a completion result of the completion of the application request by the second application server; and
   providing the completion result to the first application in response to the application request.

2. The computer-implemented method of claim 1, wherein the complexity value for the application request is determined based on a query string complexity, a historical response time for similar requests, and historical record counts for similar requests.

3. The computer-implemented method of claim 2, wherein different weights are used, when determining the complexity value, for the query string complexity, the historical response time for similar requests, and the historical record counts for similar requests.

4. The computer-implemented method of claim 1, wherein the occupancy value for the first application server is determined based on a processor utilization value, a memory utilization value, and a number of active worker threads.

5. The computer-implemented method of claim 4, wherein different weights are used, when determining the occupancy value, for the processor utilization value, the memory utilization value, and the number of active worker threads.

6. The computer-implemented method of claim 1, wherein the second application server:
   determines that an occupancy value for the second application server is less than the occupancy value threshold;
   determines that the application request is included in the global task queue;
   retrieves the application request from the global task queue;
   processes the application request, including determining the completion result for the application request; and
   places the completion result into the global results queue.

7. The computer-implemented method of claim 1, wherein the first application server monitors the global results queue for completion of the application request by an application server other than the first application server.

8. A non-transitory computer-readable storage medium coupled to one or more processors and having instructions stored thereon which, when executed by the one or more processors, cause the one or more processors to perform operations for adaptive application server request balancing:
   receiving an application request for a first application at a first application server and from a load balancer;
   in response to determining that a complexity value for the application request is greater than a complexity value threshold and that an occupancy value for the first application server is greater than an occupancy value threshold, providing the application request to a global task queue that is accessible by the first application server and other application servers;
   receiving a notification from a second application server of a completion of the application request by the second application server;
   retrieving, from a global results queue, a completion result of the completion of the application request by the second application server; and
   providing the completion result to the first application in response to the application request.

9. The computer-readable storage medium of claim 8, wherein the complexity value for the application request is determined based on a query string complexity, a historical response time for similar requests, and historical record counts for similar requests.

10. The computer-readable storage medium of claim 9, wherein different weights are used, when determining the complexity value, for the query string complexity, the historical response time for similar requests, and the historical record counts for similar requests.

11. The computer-readable storage medium of claim 8, wherein the occupancy value for the first application server is determined based on a processor utilization value, a memory utilization value, and a number of active worker threads.

12. The computer-readable storage medium of claim 11, wherein different weights are used, when determining the occupancy value, for the processor utilization value, the memory utilization value, and the number of active worker threads.

13. The computer-readable storage medium of claim 8, wherein the second application server:
   determines that an occupancy value for the second application server is less than the occupancy value threshold;
   determines that the application request is included in the global task queue;
   retrieves the application request from the global task queue;
   processes the application request, including determining the completion result for the application request; and
   places the completion result into the global results queue.

14. The computer-readable storage medium of claim 8, wherein the first application server monitors the global results queue for completion of the application request by an application server other than the first application server.

15. A system, comprising:
   a computing device; and
   a computer-readable storage device coupled to the computing device and having instructions stored thereon which, when executed by the computing device, cause the computing device to perform operations for adaptive application server request balancing, the operations comprising:
      receiving an application request for a first application at a first application server and from a load balancer;
      in response to determining that a complexity value for the application request is greater than a complexity value threshold and that an occupancy value for the first application server is greater than an occupancy value threshold, providing the application request to a global task queue that is accessible by the first application server and other application servers;
      receiving a notification from a second application server of a completion of the application request by the second application server;
      retrieving, from a global results queue, a completion result of the completion of the application request by the second application server; and
      providing the completion result to the first application in response to the application request.

16. The system of claim 15, wherein the complexity value for the application request is determined based on a query string complexity, a historical response time for similar requests, and historical record counts for similar requests.

17. The system of claim 16, wherein different weights are used, when determining the complexity value, for the query string complexity, the historical response time for similar requests, and the historical record counts for similar requests.

18. The system of claim 15, wherein the occupancy value for the first application server is determined based on a processor utilization value, a memory utilization value, and a number of active worker threads.

19. The system of claim 18, wherein different weights are used, when determining the occupancy value, for the processor utilization value, the memory utilization value, and the number of active worker threads.

20. The system of claim 15, wherein the second application server:
   determines that an occupancy value for the second application server is less than the occupancy value threshold;
   determines that the application request is included in the global task queue;
   retrieves the application request from the global task queue;
   processes the application request, including determining the completion result for the application request; and
   places the completion result into the global results queue.

* * * * *